US012496699B2

(12) United States Patent
Eardley et al.

(10) Patent No.: US 12,496,699 B2
(45) Date of Patent: Dec. 16, 2025

(54) QUIETED FRONT EXHAUST MOTOR

(71) Applicant: Ingersoll-Rand Industrial U.S., Inc., Davidson, NC (US)

(72) Inventors: Edward C. Eardley, Easton, PA (US); Ryan S. Amend, Bethlehem, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/624,824

(22) Filed: Apr. 2, 2024

(65) Prior Publication Data

US 2024/0351180 A1 Oct. 24, 2024

Related U.S. Application Data

(60) Provisional application No. 63/460,513, filed on Apr. 19, 2023.

(51) Int. Cl.

| | |
|---|---|
| ***B25B 21/00*** | (2006.01) |
| ***B25F 5/00*** | (2006.01) |
| ***B25F 5/02*** | (2006.01) |
| ***F01C 20/10*** | (2006.01) |
| ***F01C 21/10*** | (2006.01) |

(52) U.S. Cl.

CPC .............. *B25F 5/00* (2013.01); *B25B 21/005* (2013.01)

(58) Field of Classification Search

CPC .......... B25B 21/005; B25F 5/02; F01C 20/10; F01C 21/108

USPC .................................................. 173/218, 169

See application file for complete search history.

(56) References Cited

U.S. PATENT DOCUMENTS 3,465,646 A * 9/1969 Kiester .................. F01C 1/344 418/86

4,197,061 A * 4/1980 Hill ........................ F01C 13/02 418/173

6,923,272 B2 * 8/2005 Jansson .................... B25F 5/00 173/168

(Continued)

FOREIGN PATENT DOCUMENTS

WO 0154865 A2 8/2001

OTHER PUBLICATIONS

Extended European Search Report for Patent Application No. 24170578.9, dated Aug. 27, 2024.

*Primary Examiner* — Thanh K Truong
*Assistant Examiner* — Patrick B Fry
(74) *Attorney, Agent, or Firm* — Kevin E. West; Advent, LLP

(57) ABSTRACT

A pneumatic wrench including a pneumatic motor that includes a rotor, a rotor housing, an endplate, and a wear plate. The rotor has an output shaft configured to rotate about an axis and a plurality of vanes that extend radially from the axis that compressed air exerts work against to drive the rotor. The rotor housing has a cavity configured to house the rotor, receive the compressed air, and direct the compressed air about the rotor and out of the rotor housing. The endplate is coupled to the rotor housing and configured to receive the output shaft. The endplate includes a channel that is in fluid communication with the cavity. The wear plate is disposed between the endplate and the rotor housing and defines an exhaust port between the cavity and the channel for directing airflow from the cavity to the channel in an axial direction.

12 Claims, 6 Drawing Sheets

(56) References Cited

U.S. PATENT DOCUMENTS

| | | | | |
|---|---|---|---|---|
| 7,222,680 | B2 * | 5/2007 | Livingston .............. | F01C 20/04<br>173/218 |
| 9,835,031 | B2 * | 12/2017 | Nelson .................... | F01C 20/04 |
| 2006/0102366 | A1 | 5/2006 | Kuo | |
| 2006/0113099 | A1 | 6/2006 | Livingston et al. | |
| 2007/0217940 | A1 * | 9/2007 | Chang ................... | F01C 21/104<br>418/270 |

* cited by examiner

QUIETED FRONT EXHAUST MOTOR

BACKGROUND

One of the key components in a pneumatic impact wrench is the air motor, which is responsible for converting the compressed air's energy into mechanical energy, ultimately generating the torque output. Several types of air motors exist, with the most common being the rotary vane motor.

Rotary vane motors utilize a series of vanes, typically made from carbon or other durable materials, that slide in and out of slots within a cylindrical rotor. As compressed air enters the motor, it causes the rotor to spin, and the centrifugal force generated by the spinning rotor extends the vanes, creating a seal against the motor's housing. The movement of the vanes within the slots generates the mechanical energy required to drive the impact wrench.

DRAWINGS

The Detailed Description is described with reference to the accompanying figures. The use of the same reference numbers in different instances in the description and the figures may indicate similar or identical items.

DETAILED DESCRIPTION

Figure 1:
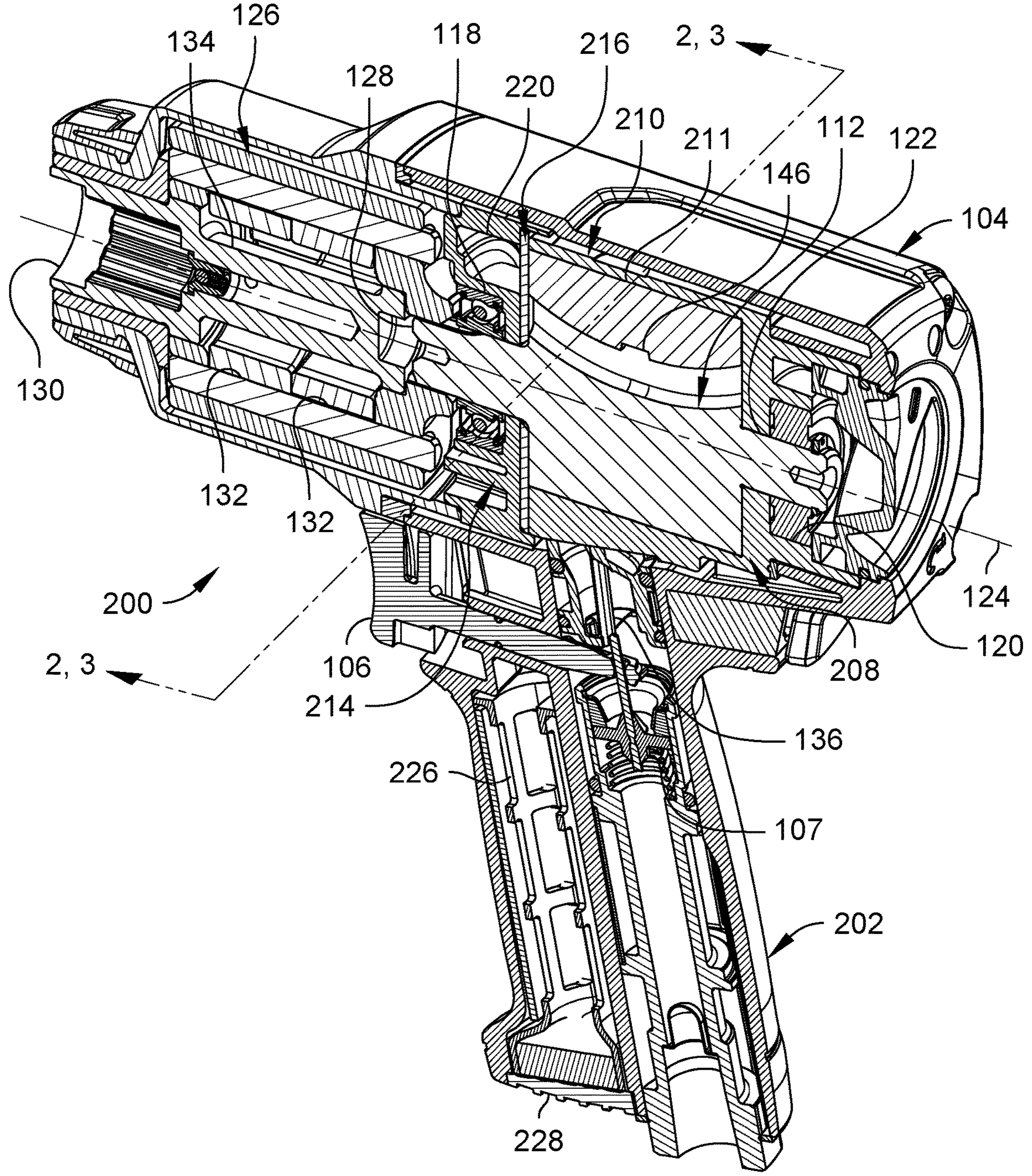
FIG. 1 is a cross-sectional perspective view illustrating a pneumatic wrench in accordance with example embodiments of the present disclosure.
Figure 2:
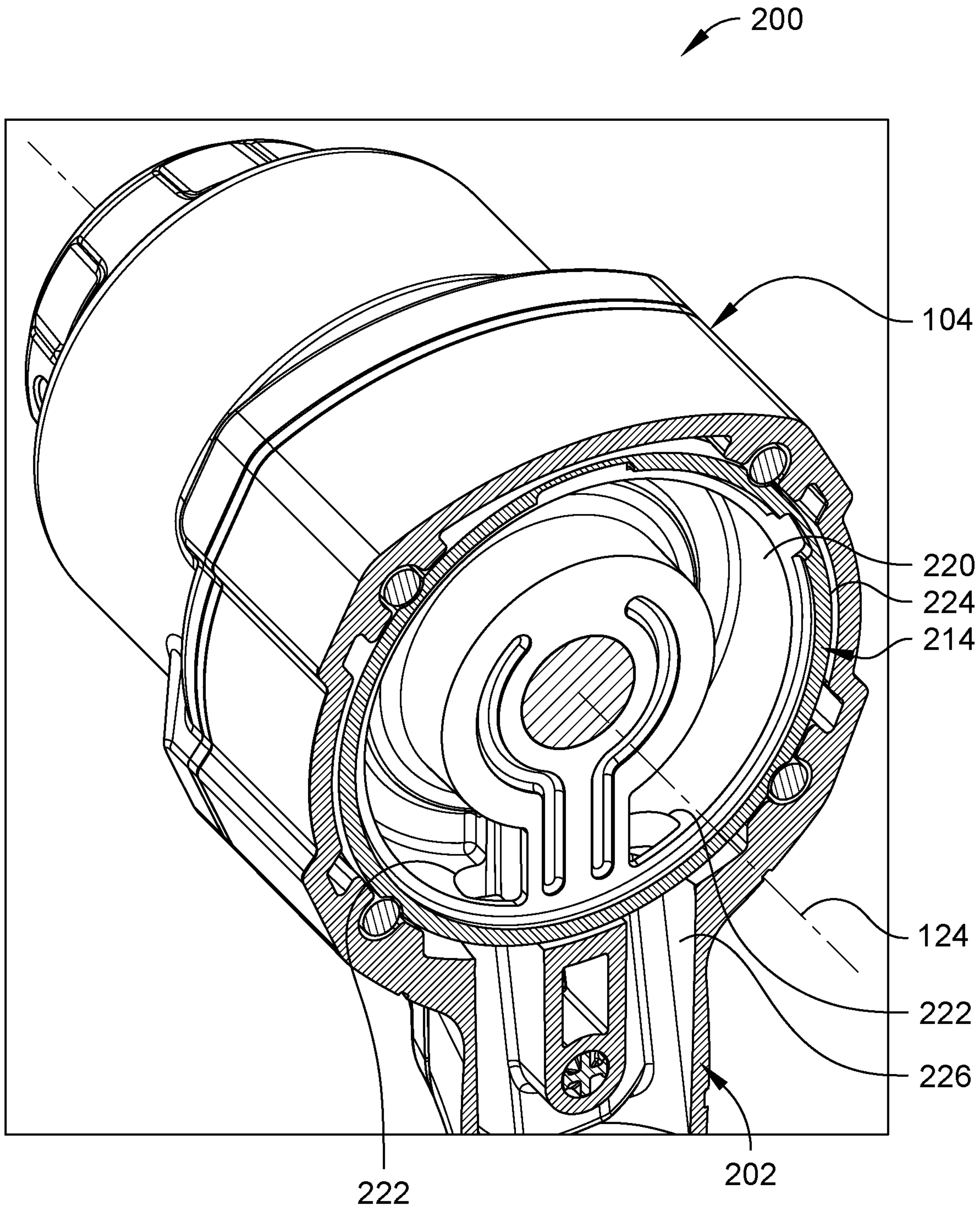
FIG. 2 is a partial cross-sectional perspective view illustrating a channel of an end plate of the pneumatic wrench of FIG. 1, with a wear plate removed for clarity.
Figure 3:
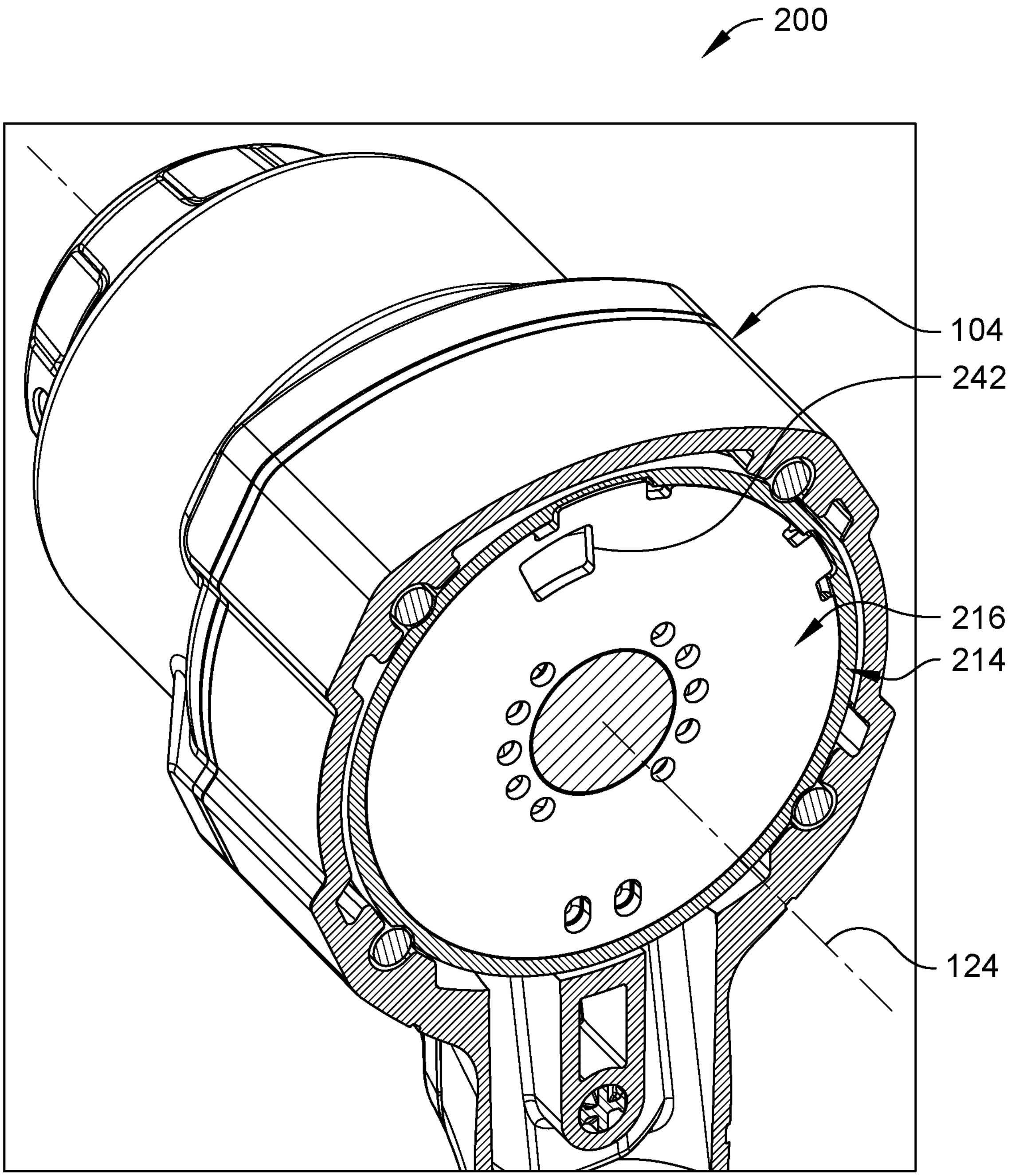
FIG. 3 is a partial cross-sectional perspective view illustrating a wear plate of the pneumatic wrench of FIG. 1.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

OVERVIEW

Conventional pneumatic wrenches, such as pneumatic impact wrenches, rely on compressed air to push on a series of vanes that rotate about an axis and drive a rotor within a rotor housing. After a portion of the compressed air has performed work on the rotor, the portion of compressed air is vented from the rotor housing through an exhaust port located generally on the rotor housing such that the portion of compressed air vents radially from the axis and onto a housing of the pneumatic wrench.

However, since the compressed air vents from the exhaust port onto the housing, two undesirable effects are commonly produced. Firstly, due to the Joule-Thomson effect, the compressed air exiting through the exhaust port results in a significant temperature drop which can reach temperatures well below freezing. Through prolonged use, this temperature drop can make the housing too cold for the user to touch, making it uncomfortable for the user to grip the housing to steady the pneumatic wrench during operation, and, while operating the tool in humid environments, ice can accumulate on the housing, thus further making it impractical for the user to grip the housing. Secondly, air is released through the exhaust port in pulses which impact and vibrate the housing and in turn produce dangerous levels of noise at the detriment of the user and/or those around the user. Prior solutions attempt to dampen the noise by muffling the air exiting the exhaust port with a piece of felt, however, over time the piece of felt can collect oil, grease, and debris, which inhibits airflow and thus reduces the output power of the pneumatic wrench. Therefore, a new solution is desired to dampen the noise output of a pneumatic impact wrench as well as maintain a housing temperature that is comfortable to the touch after prolonged use.

DETAILED DESCRIPTION OF THE EMBODIMENTS

As disclosed herein, a pneumatic wrench is provided to include an exhaust port that directs air in an axial direction respective to an axis of the rotor. The exhaust port is defined by a wear plate that vents exiting air to a channel defined by an endplate for directing airflow from the rotor housing.

Referring now generally to FIGS. 1 through 5, a pneumatic wrench 200 is described in accordance with example embodiments of the present disclosure. As described, the pneumatic wrench 200 includes a handle 202 coupled to a housing 104 configured to allow a user to grip the handle 202 and press a trigger 106 disposed on the handle 202 to operate the pneumatic wrench 200. The trigger 106 is operatively coupled to an air valve 107 that selectively controls incoming compressed air such that, when the user presses the trigger 106, the air valve 107 releases the compressed air into a pneumatic motor 208 for driving the pneumatic motor 208.

The pneumatic motor 208 includes a rotor housing 210, a rotor 112 disposed within the rotor housing 210, an endplate 214, and a wear plate 216 disposed between the rotor housing 210 and the endplate 214. Two bearing assemblies, 118 and 120, are positioned at opposing ends of the pneumatic motor 208 and are configured to receive respective ends of a rotor shaft 122 of the rotor 112 and are configured to permit the rotor shaft 122 to rotate about an axis 124.

In embodiments, an impact mechanism 126 is coupled to an output end 128 of the rotor shaft 122 which converts rotations made by the output end 128 into a high torque-short duration impulse or impact at an impact output shaft 130. The impact mechanism 126 generally includes one or more hammers 132 rotatably coupled to the output end 128 which periodically impact a respective one or more anvils 134 coupled to the impact output shaft 130 to deliver the high torque-short duration impulses to the impact output shaft 130. An appropriate socket can then be attached to the impact output shaft 130 for loosening or tightening fasteners.

The rotor housing 210 has a cavity 211 that is configured to house the rotor 112, receive the compressed air, and direct the compressed air about the rotor 112 and out of the rotor housing 210. As described, the cavity 211 is defined by the rotor housing 210. Moreover, the rotor housing 210 has an opening 213 (see FIG. 5) for receiving the rotor 112 along the axis 124. The rotor housing 210 further includes two intakes disposed circumferentially on the rotor housing 210 such that the two intakes are in fluid communication with the cavity 211. A directional control valve 136 configured to be toggled by the user is disposed on the handle to control which intake of the two intakes receives compressed air: a first intake 238 is configured to receive compressed air for rotating the rotor in a first direction (e.g., a counter-clockwise direction), and a second intake 240 is configured to receive compressed air for rotating the rotor in a second direction that is opposite to the first direction (e.g., a clockwise direction).

The rotor 112 includes a series of vanes 146 that extend radially from the axis 124 of the rotor 112 which are further configured to slide radially within respective radial slots (obscured from view) defined by the rotor 112. As compressed air enters the rotor housing 210 through either the first intake 238 or the second intake 240, air pressure from the entering compressed air exerts a torque on the rotor 112 by exerting pressure on the series of vanes, which subsequently produces work as the air pressure against the series of vanes cause the rotor 112 to rotate. As the rotor 112 rotates, portions of compressed air entering the rotor housing 210 are captured and bound angularly between adjacent vanes 146, radially between the rotor 112 and the rotor housing 210, and axially between rotor housing 210 and the wear plate 216 as the rotor 112. As the rotor rotates, the portion of compressed air remains captured until the captured air reaches and vents through an exhaust port 242 defined by the wear plate 216 (see FIG. 3). In embodiments, the vanes 146 are biased radially outwards to remain in contact communication with the rotor housing 210 as the rotor 112 rotates, which can either be achieved through a spring biasing mechanism disposed within each respective slot or through supplied air pressure to the slots that apply outward radial pressure to the vanes 146. Moreover, as the rotor 112 spools up, centrifugal forces further drive the vanes 146 radially outward.

Figure 4:
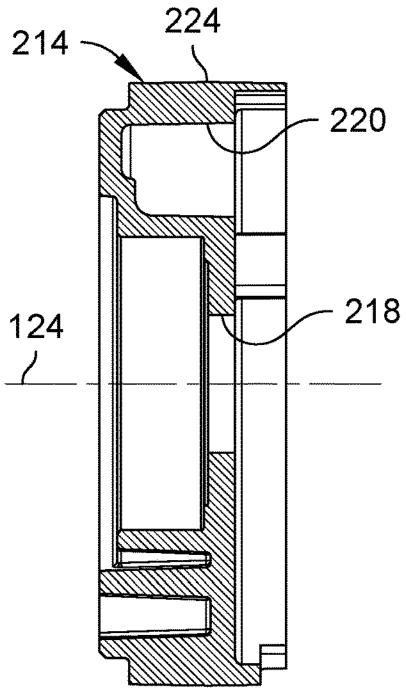
FIG. 4 is a cross-sectional side elevation view of an endplate of the pneumatic wrench of FIG. 1.
Figure 5:
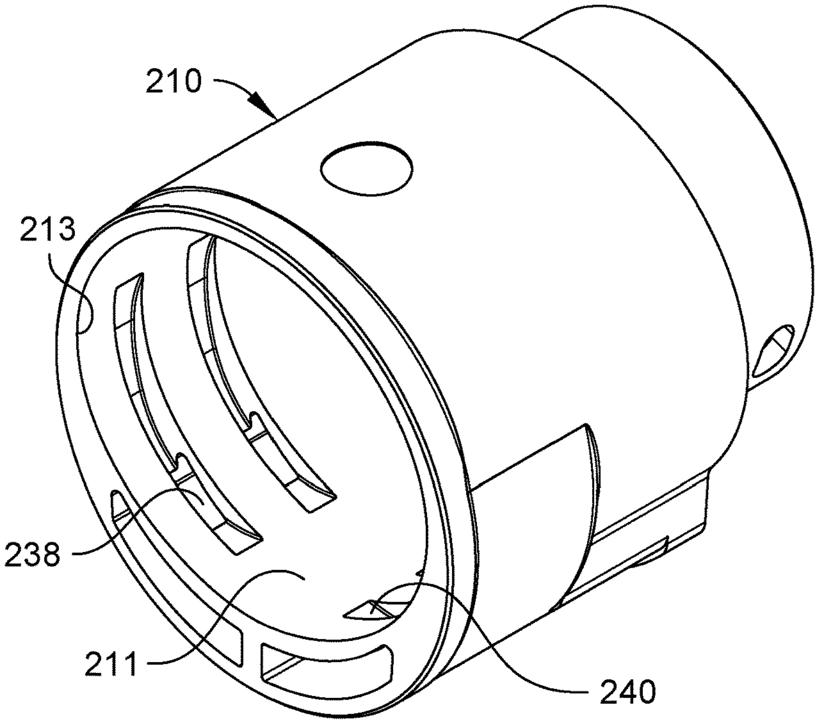
FIG. 5 is a perspective view of a rotor housing of the pneumatic wrench of FIG. 1.

As described, the endplate 214 is configured to receive the output shaft 128 through the endplate through an opening 218 (see FIG. 4). In embodiments, the endplate 214 is further configured to receive the bearing assembly 118 such that the output shaft 128 passes through both the opening 218 and the bearing assembly 118. As described, the endplate 214 further includes a channel 220 defined by the endplate 214 that is circumferential about the axis 124 and is in fluid communication with the rotor housing 210 for directing airflow received from the rotor housing 210. The endplate 214 further includes one or more holes 222 (see FIG. 2) disposed on a sidewall 224 of the endplate 214 that the received air passes out from the channel 220. In some embodiments, the one or more holes 222 vent to a handle channel 226 defined within the handle 202. In a further embodiment, the handle 202 includes a handle exhaust port 228 that is in fluid communication with the handle channel 226 and the channel 220 of the endplate such that air received by channel 220 is directed through the one or more holes 222, to the handle channel 226, through the handle exhaust port 228 of the handle 202, and out to ambient air.

As described, the wear plate 216 is a planar annular disk configured to receive the output shaft 128 through the wear plate 216. The wear plate 216 is disposed between the endplate 214 and the rotor housing 210 such that the wear plate serves as a partition between the channel 220 of the endplate 214 and the cavity 111 of the rotor housing 210 except for the exhaust port 242 defined by the wear plate 216 that directs airflow from the cavity 211 to the channel 220. Under this arrangement, air is vented from the rotor housing 210, not in a radial direction, but in an axial direction into the channel 220 of the endplate 214. This arrangement provides several advantages: firstly, the Joule-Thomson effect of the exhausting air from the rotor housing 210 onto the endplate 214 cools the endplate 214 instead of the housing 104, thus allowing for a user to comfortably grip the housing 104 for tool stability without having to avoid cold temperatures or accumulated ice. Furthermore, with the endplate 214 coupled with the bearing assembly 118 such that the channel 220 circumferentially surrounds the bearing assembly 118, the resulting Joule-Thomson effect in turn cools the bearing assembly 118, which would otherwise heat up and eventually degrade bearing lubricants after prolonged use, thereby extending the lifetime and durability of the bearing assembly 118. Secondly, since the exhausting air from the rotor housing 210 is directed to impact and diffuse within the channel 220 of the endplate 214 instead of onto the housing 104, a significant noise reduction is achieved, thereby allowing for more tolerable noise levels.

Figure 6A:
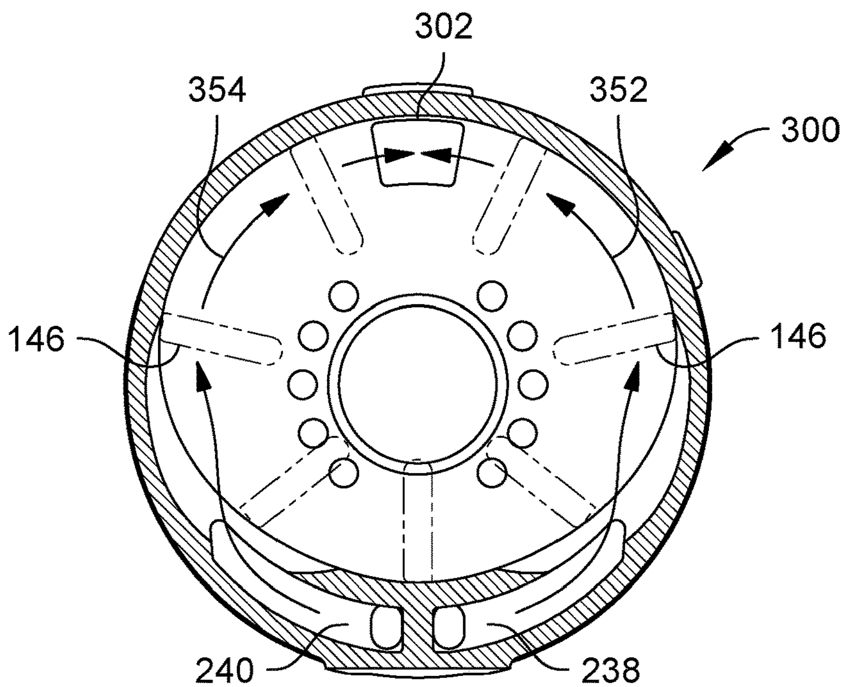
FIG. 6A is a neutral-biased wear plate for the pneumatic wrench of FIG. 1 in accordance with an example embodiment of the present disclosure.
Figure 6B:
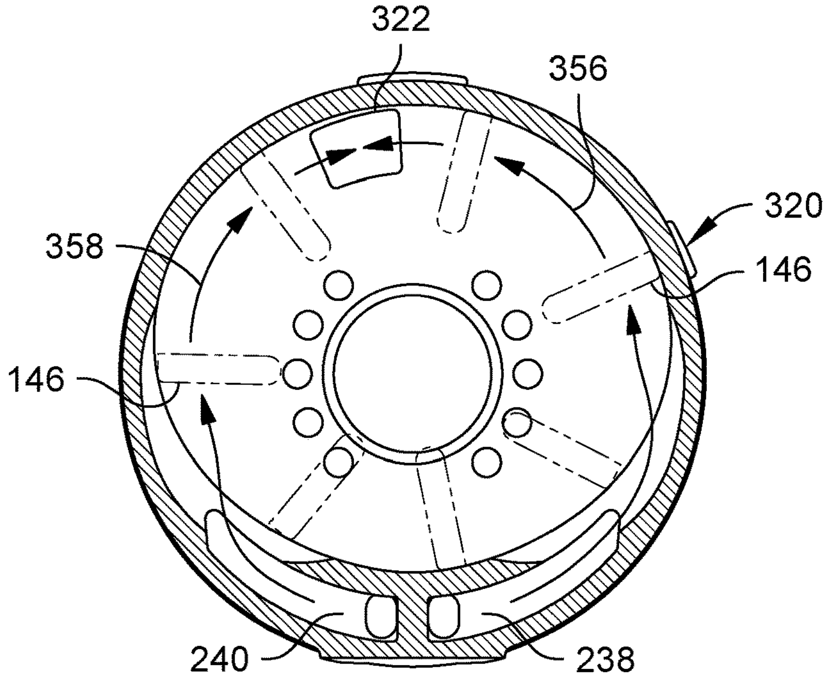
FIG. 6B is a reverse-biased wear plate for the pneumatic wrench of FIG. 1 in accordance with an example embodiment of the present disclosure.
Figure 6C:
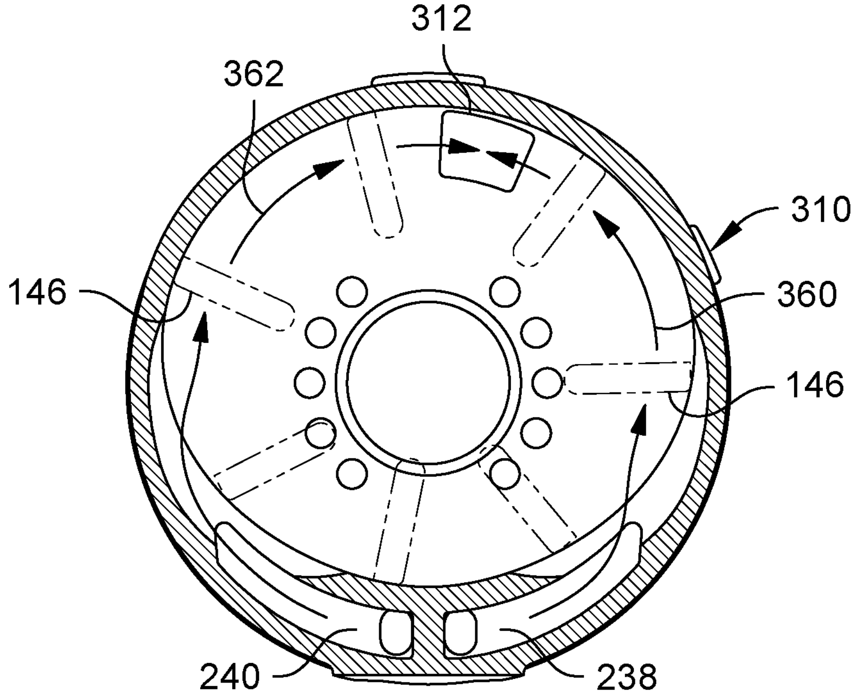
FIG. 6C is a forward-biased wear plate for the pneumatic wrench of FIG. 1 in accordance with an example embodiment of the present disclosure.

Now referring to FIGS. 6A through 6C, various embodiments of the wear plate are depicted and described. In embodiments, the wear plate 216 is configured to be swappable for another wear plate to accommodate a directional biasing for the pneumatic wrench. For example, in FIG. 6A, wear plate 300 has a neutral-biased exhaust port 302 such that a first distance (i.e., compressed air flow path 352) that the compressed air from the first intake 238 must traverse about the rotor counter-clockwise (i.e., a reverse operation typically used to loosen bolts having right-handed threading) to the neutral-biased exhaust port 302 is the same as a second distance (i.e., compressed air flow path 354) that the compressed air from the second intake 240 must traverse about the rotor counter-clockwise (i.e., a reverse operation typically used to tighten bolts having right-handed threading) to the neutral-biased exhaust port 302. Since the two distances are equal, then the comparative power output between the forward operation and the reverse operation is also equal since the effective distance and correlated work performed by a portion of compressed air traversing in either direction is the same.

In another example, in FIG. 6B, wear plate 320 has a reverse-biased exhaust port 322 such that a first distance (i.e., compressed air flow path 356) that the compressed air from the first intake 238 must traverse about the rotor counter-clockwise (i.e., a reverse operation) to the reversed-biased exhaust port 322 is greater than a second distance (i.e., compressed air flow path 358) that the compressed air from the second intake 240 must traverse about the rotor clockwise (i.e., a forward operation) to the reversed-biased exhaust port 322. Since the first distance is greater than the second distance, then the comparative power output between the reverse operation is greater than the forward operation since the effective distance and correlated work performed by a portion of compressed air traversing in the reverse operation is greater.

In yet another example, in FIG. 6C, wear plate 310 has a forward-biased exhaust port 312 such that a first distance (i.e., compressed air flow path 360) that the compressed air from the first intake 238 must traverse about the rotor counter-clockwise (i.e., a reverse operation) to the forward-biased exhaust port 312 is less than a second distance (i.e., compressed air flow path 362) that the compressed air from the second intake 240 must traverse about the rotor clockwise (i.e., a forward operation) to the forward-biased exhaust port 312. Since the first distance is less than the second distance, then the comparative power output between the forward operation is greater than the reverse operation since the effective distance and correlated work performed by a portion of compressed air traversing in the forward operation is greater.

Thus, from these examples, each of the wear plates 300, 310, and 300 may be swappable with each other to accommodate a user-preferred directional biasing for the pneumatic wrench.

In further embodiments, the wear plates are configured to be reversible. For example, the forward-biased wear plate 310 can be reversed or flipped so as to become a reverse-biased wear plate 320.

In embodiments, a pneumatic wrench includes a housing and a pneumatic motor housed by the housing, the pneumatic motor including: a rotor housing defining a cavity, a first intake, and a second intake, the first intake and the second intake in fluid communication with the cavity, the rotor housing configured to receive compressed air from either the first intake or the second intake; a rotor housed by the rotor housing, the rotor including an output shaft such that the rotor is configured to rotate about an axis defined by the output shaft, the rotor including a plurality of vanes that extend radially from the axis, the rotor configured to rotate when the compressed air exerts work against one or more vanes among the plurality of vanes, the traversal of compressed air through the pneumatic motor defines an airflow; an endplate coupled to the rotor housing, the endplate configured to receive the output shaft through the endplate, the endplate defining a channel in fluid communication with the cavity for directing the airflow from the rotor housing; and a wear plate disposed between the endplate and the rotor housing, the wear plate defining an exhaust port, wherein the airflow is configured to pass through the exhaust port from the cavity to the channel.

In embodiments, the exhaust port of the wear plate is a neutral-biased exhaust port such that a first distance traversed by an airflow measured from the first intake to the exhaust port is equal to a second distance traversed by an airflow measured from the second intake to the exhaust port.

In embodiments, the exhaust port of the wear plate is biased such that a first distance traversed by an airflow measured from the first intake to the exhaust port is greater than a second distance traversed by an airflow measured from the second intake to the exhaust port, resulting in a power output of the pneumatic wrench that is greater when the airflow traverses the first distance than when the airflow traverses the second distance.

In embodiments, the wear plate is reversible, such that, when the wear plate is reversed, the first distance traversed by the airflow measured from the first intake to the exhaust port is less than the second distance traversed by the airflow measured from the second intake to the exhaust port, resulting in a power output of the pneumatic wrench that is greater when the airflow traverses the second distance than when the airflow traverses the second distance.

In embodiments, the wear plate is swappable for another wear plate having a neutral-biased exhaust port such that a first distance traversed by the airflow measured from the first intake to the neutral-biased exhaust port is equal to a second distance traversed by the airflow measured from the second intake to the neutral-biased.

In embodiments, the channel is formed circumferentially about the axis.

In embodiments, the endplate further comprises one or more holes disposed on a sidewall that defines the channel of the endplate, the airflow directed by the channel configured to vent through the one or more holes.

In embodiments, the endplate further comprises one or more holes disposed on a sidewall that defines the channel of the endplate, the airflow directed by the channel configured to vent through the one or more holes.

In embodiments, the one or more holes of the endplate are in fluid communication with a handle channel and a handle exhaust port disposed on or within a handle of the pneumatic wrench.

In embodiments, the airflow configured to pass through the exhaust port from the cavity to the channel traverses axially relative to the axis through the exhaust port.

In embodiments, a pneumatic motor includes: a rotor housing defining a cavity, a first intake, and a second intake, the first intake and the second intake in fluid communication with the cavity, the rotor housing configured to receive compressed air from either the first intake or the second intake; a rotor housed by the rotor housing, the rotor including an output shaft such that the rotor is configured to rotate about an axis defined by the output shaft, the rotor including a plurality of vanes that extend radially from the axis, the rotor configured to rotate when the compressed air exerts work against one or more vanes among the plurality of vanes, the traversal of compressed air through the pneumatic motor defines an airflow; an endplate coupled to the rotor housing, the endplate configured to receive the output shaft through the endplate, the endplate defining a channel in fluid communication with the cavity for directing the airflow from the rotor housing; and a wear plate disposed between the endplate and the rotor housing, the wear plate defining an exhaust port, wherein the airflow is configured to pass through the exhaust port from the cavity to the channel.

In embodiments, the exhaust port of the wear plate is a neutral-biased exhaust port such that a first distance traversed by an airflow measured from the first intake to the exhaust port is equal to a second distance traversed by an airflow measured from the second intake to the exhaust port.

In embodiments, the exhaust port of the wear plate is biased such that a first distance traversed by an airflow measured from the first intake to the exhaust port is greater than a second distance traversed by an airflow measured from the second intake to the exhaust port, resulting in a power output of the pneumatic motor that is greater when the airflow traverses the first distance than when the airflow traverses the second distance.

In embodiments, the wear plate is reversible, such that, when the wear plate is reversed, the first distance traversed by the airflow measured from the first intake to the exhaust port is less than the second distance traversed by the airflow measured from the second intake to the exhaust port, resulting in a power output of the pneumatic motor that is greater when the airflow traverses the second distance than when the airflow traverses the second distance.

In embodiments, the wear plate is swappable for another wear plate having a neutral-biased exhaust port such that a first distance traversed by the airflow measured from the first intake to the neutral-biased exhaust port is equal to a second distance traversed by the airflow measured from the second intake to the neutral-biased.

In embodiments, the channel is formed circumferentially about the axis.

In embodiments, the endplate further comprises one or more holes disposed on a sidewall that defines the channel of the endplate, the airflow directed by the channel configured to vent through the one or more holes.

In embodiments, a pneumatic wrench includes a housing and a pneumatic motor housed by the housing, the pneumatic motor including: a rotor housing defining a cavity and an intake, the intake in fluid communication with the cavity, the rotor housing configured to receive compressed air from the intake; a rotor housed by the rotor housing, the rotor including an output shaft such that the rotor is configured to rotate about an axis defined by the output shaft, the rotor including a plurality of vanes that extend radially from the axis, the rotor configured to rotate when the compressed air exerts work against one or more vanes among the plurality of vanes, the traversal of compressed air through the pneumatic motor defines an airflow; an endplate coupled to the rotor housing, the endplate configured to receive the output shaft through the endplate, the endplate defining a channel in fluid communication with the cavity for directing the airflow from the rotor housing; and a wear plate disposed between the endplate and the rotor housing, the wear plate defining an exhaust port, wherein the airflow is configured to pass through the exhaust port from the cavity to the channel, wherein the airflow measured from the intake to the exhaust port defines a first distance.

In embodiments, the wear plate is swappable for a second wear plate, wherein the airflow measured from the intake to an exhaust port of the second wear plate defines a second distance, the second distance being either greater or less than the first distance.

In embodiments, the second wear plate is reversible, such that, when the second wear plate is reversed, the airflow measured from the intake to the exhaust port of the second wear plate defines a third distance, the third distance being either greater or less than the second distance.

In embodiments, the endplate further comprises one or more holes disposed on a sidewall that defines the channel of the endplate, the airflow directed by the channel configured to vent through the one or more holes.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

While the subject matter has been illustrated and described in detail in the drawings and foregoing description, the same is to be considered as illustrative and not restrictive in character, it being understood that only the preferred embodiments have been shown and described and that all changes and modifications that come within the spirit of the subject matters are desired to be protected. It should be understood that while the use of words such as preferable, preferably, preferred, or more preferred utilized in the description above indicate that the feature so described may be more desirable, it nonetheless may not be necessary and embodiments lacking the same may be contemplated as within the scope of the subject matter, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A pneumatic wrench comprising:

a housing; and a pneumatic motor housed by the housing, the pneumatic motor including:

a rotor housing defining a cavity, a first intake, and a second intake, the first intake and the second intake in fluid communication with the cavity, the rotor housing configured to receive compressed air from either the first intake or the second intake, a rotor housed by the rotor housing, the rotor including an output shaft such that the rotor is configured to rotate about an axis defined by the output shaft, the rotor including a plurality of vanes that extend radially from the axis, the rotor configured to rotate when the compressed air exerts work against one or more vanes among the plurality of vanes, the traversal of compressed air through the pneumatic motor defines an airflow, an endplate coupled to the rotor housing, the endplate configured to receive the output shaft through the endplate, the endplate defining a channel in fluid communication with the cavity for directing the airflow from the rotor housing, and a wear plate disposed between the endplate and the rotor housing, the wear plate defining an exhaust port, wherein the airflow is configured to pass through the exhaust port from the cavity to the channel, wherein the exhaust port of the wear plate is biased such that a first distance traversed by an airflow measured from the first intake to the exhaust port is greater than a second distance traversed by an airflow measured from the second intake to the exhaust port, resulting in a power output of the pneumatic wrench that is greater when the airflow traverses the first distance than when the airflow traverses the second distance, and wherein the wear plate is reversible, such that, when the wear plate is reversed, the first distance traversed by the airflow measured from the first intake to the exhaust port is less than the second distance traversed by the airflow measured from the second intake to the exhaust port, resulting in a power output of the pneumatic wrench that is greater when the airflow traverses the second distance than when the airflow traverses the first distance.

2. The pneumatic wrench of claim 1, wherein the wear plate is swappable for another wear plate having a neutral-biased exhaust port such that a first distance traversed by the airflow measured from the first intake to the neutral-biased exhaust port is equal to a second distance traversed by the airflow measured from the second intake to the neutral-biased.

3. The pneumatic wrench of claim 1, wherein the channel is formed circumferentially about the axis.

4. The pneumatic wrench of claim 1, wherein the endplate further comprises one or more holes disposed on a sidewall that defines the channel of the endplate, the airflow directed by the channel configured to vent through the one or more holes.

5. The pneumatic wrench of claim 4, wherein the one or more holes of the endplate are in fluid communication with a handle channel and a handle exhaust port disposed on or within a handle of the pneumatic wrench.

6. The pneumatic wrench of claim 1, wherein the airflow configured to pass through the exhaust port from the cavity to the channel traverses axially relative to the axis through the exhaust port.

7. A pneumatic motor comprising:

a rotor housing defining a cavity, a first intake, and a second intake, the first intake and the second intake in fluid communication with the cavity, the rotor housing configured to receive compressed air from either the first intake or the second intake;

a rotor housed by the rotor housing, the rotor including an output shaft such that the rotor is configured to rotate about an axis defined by the output shaft, the rotor including a plurality of vanes that extend radially from the axis, the rotor configured to rotate when the compressed air exerts work against one or more vanes among the plurality of vanes, the traversal of compressed air through the pneumatic motor defines an airflow;

an endplate coupled to the rotor housing, the endplate configured to receive the output shaft through the endplate, the endplate defining a channel in fluid communication with the cavity for directing the airflow from the rotor housing; and a wear plate disposed between the endplate and the rotor housing, the wear plate defining an exhaust port, wherein the airflow is configured to pass through the exhaust port from the cavity to the channel, wherein the exhaust port of the wear plate is biased such that a first distance traversed by an airflow measured from the first intake to the exhaust port is greater than a second distance traversed by an airflow measured from the second intake to the exhaust port, resulting in a power output of the pneumatic motor that is greater when the airflow traverses the first distance than when the airflow traverses the second distance, and wherein the wear plate is reversible, such that, when the wear plate is reversed, the first distance traversed by the airflow measured from the first intake to the exhaust port is less than the second distance traversed by the airflow measured from the second intake to the exhaust port, resulting in a power output of the pneumatic motor that is greater when the airflow traverses the second distance than when the airflow traverses the first distance.

8. The pneumatic motor of claim 7, wherein the wear plate is swappable for another wear plate having a neutral-biased exhaust port such that a first distance traversed by the airflow measured from the first intake to the neutral-biased exhaust port is equal to a second distance traversed by the airflow measured from the second intake to the neutral-biased.

9. The pneumatic wrench of claim 7, wherein the channel is formed circumferentially about the axis.

10. The pneumatic wrench of claim 7, wherein the endplate further comprises one or more holes disposed on a sidewall that defines the channel of the endplate, the airflow directed by the channel configured to vent through the one or more holes.

11. A pneumatic wrench comprising:

a housing; and a pneumatic motor housed by the housing, the pneumatic motor including:

a rotor housing defining a cavity and an intake, the intake in fluid communication with the cavity, the rotor housing configured to receive compressed air from the intake, a rotor housed by the rotor housing, the rotor including an output shaft such that the rotor is configured to rotate about an axis defined by the output shaft, the rotor including a plurality of vanes that extend radially from the axis, the rotor configured to rotate when the compressed air exerts work against one or more vanes among the plurality of vanes, the traversal of compressed air through the pneumatic motor defines an airflow, an endplate coupled to the rotor housing, the endplate configured to receive the output shaft through the endplate, the endplate defining a channel in fluid communication with the cavity for directing the airflow from the rotor housing, and a wear plate disposed between the endplate and the rotor housing, the wear plate defining an exhaust port, wherein the airflow is configured to pass through the exhaust port from the cavity to the channel, wherein the airflow measured from the intake to the exhaust port defines a first distance, wherein the wear plate is swappable for a second wear plate, wherein the airflow measured from the intake to an exhaust port of the second wear plate defines a second distance, the second distance being either greater or less than the first distance, and wherein the second wear plate is reversible, such that, when the second wear plate is reversed, the airflow measured from the intake to the exhaust port of the second wear plate defines a third distance, the third distance being either greater or less than the second distance.

12. The pneumatic wrench of claim 11, wherein the endplate further comprises one or more holes disposed on a sidewall that defines the channel of the endplate, the airflow directed by the channel configured to vent through the one or more holes.

* * * * *